US008126767B1

(12) United States Patent
Aldridge et al.

(10) Patent No.: US 8,126,767 B1
(45) Date of Patent: Feb. 28, 2012

(54) SYSTEM AND METHOD FOR TUNING A SEGMENTED MODEL REPRESENTATING PRODUCT FLOW THROUGH A SUPPLY CHAIN OR MANUFACTURING PROCESS

(75) Inventors: Bruce E. Aldridge, Oceanside, CA (US); Rangarajan S. Thirumpoondi, Irvine, CA (US)

(73) Assignee: Teradata US, Inc., Dayton, OH (US)

( * ) Notice: Subject to any disclaimer, the term of this patent is extended or adjusted under 35 U.S.C. 154(b) by 2630 days.

(21) Appl. No.: 10/742,966

(22) Filed: Aug. 9, 2004

(51) Int. Cl.
*G06Q 10/00* (2006.01)

(52) U.S. Cl. ...................................... 705/7.36
(58) Field of Classification Search .................. 705/7.36
See application file for complete search history.

(56) References Cited

U.S. PATENT DOCUMENTS

| | | | |
|---|---|---|---|
| 6,581,040 B1* | 6/2003 | Wright et al. ............... | 705/8 |
| 6,782,390 B2* | 8/2004 | Lee et al. ................... | 707/101 |
| 6,810,368 B1* | 10/2004 | Pednault .................... | 703/2 |
| 6,839,682 B1* | 1/2005 | Blume et al. ................ | 705/10 |
| 7,072,841 B1* | 7/2006 | Pednault .................... | 705/4 |
| 7,451,065 B2* | 11/2008 | Pednault et al. ............ | 703/2 |
| 2003/0018601 A1* | 1/2003 | Lee et al. ................... | 706/45 |
| 2003/0176931 A1* | 9/2003 | Pednault et al. ............ | 700/31 |

OTHER PUBLICATIONS

"Seibel Systems and Teradata Announce Strategic Partnership for Analytic Applications and Enterprise Business Intelligence". Business Wire. New York: Apr 20, 2004 p. 1.*

* cited by examiner

*Primary Examiner* — Johnna Loftis
(74) *Attorney, Agent, or Firm* — James Stover

(57) ABSTRACT

A method of systematically applying parameter evaluation techniques to large numbers of complex segmented models used for managing and analyzing a segmented manufacturing or supply chain process. These models include a plurality of segment models, each segment model representing a process segment within the segmented manufacturing or supply chain process and comprising a mathematical expression including at least one parameter. The method compares predicted values generated by a segment model with actual observed values to determining a score representative of the performance of the segment model. New parameters for the mathematical equation associated with the segment model are determined through statistical techniques when the model score indicates an unacceptable performance of the segment model. The segment models may be evaluated and updated in parallel and without manual intervention.

11 Claims, 10 Drawing Sheets

FIG. 11

SYSTEM AND METHOD FOR TUNING A SEGMENTED MODEL REPRESENTATING PRODUCT FLOW THROUGH A SUPPLY CHAIN OR MANUFACTURING PROCESS

FIELD OF THE INVENTION

This invention relates in general to systems for managing and modeling manufacturing and supply chain product flows, and in particular, to the implementation of a system and method for tuning complex analytical models utilized in evaluating segmented production and logistics processes.

BACKGROUND OF THE INVENTION

A "supply chain" refers to a chain of entities, paths, and other points across which a raw material, part, or product is processed, transferred, and/or otherwise manipulated. Typically, the supply chain for a business enterprise includes suppliers, manufacturing centers, warehouses, distribution centers, and retail outlets. Efficient and cost-effective supply chain management requires controlling the flow and storage of raw materials, work-in-process inventory and finished products within and between various facilities. The goal of a properly managed supply chain is to allow merchandise to be produced and distributed in the right quantities, to the right locations and at the right time, in order to minimize system-wide costs while satisfying customer service expectations.

The steps of the supply chain generally perform different processes involving different organizations, measurement standards, and responsibilities. The supply chain network must therefore take into account every facility or step that has an impact on cost and plays a role in making the product available to the customer. Similarly, the steps performed in product flow from supplier to customer are not likely to be static or a simple "one-path" route. Efficiency and costs demand that the supply chain remain dynamic and adjust to variations.

Historically each section of the supply chain tends to be locally optimized. For example, transportation companies optimize their costs and logistics without much regard to the effects on other sections of the chain such as manufacturing or warehousing. This has resulted in different sections of the supply chain being managed by different systems and a lack of continuity for analysis across sections. As an example of such discontinuity, a manufacturer may assign a serial number to a product for in-house analysis, but the shipping company may track the product by another identification such as order number. As a result, integration of information and tracing of product from one step to another in the supply chain can be a difficult task.

Implementation of data base technology, such as a data warehouse, provides a framework for tracking and reporting on extremely complex product flows associated with manufacturing and supply chain. Additional framework, required to support analytical models and projections, can be provided by segmentation as described in U.S. patent application Ser. No. 10/254,234, filed on Sep. 25, 2002. application Ser. No. 10/254,234, entitled "ANALYZING A SUPPLY CHAIN BASED ON A SEGMENTED REPRESENTATION OF THE SUPPLY CHAIN," by Bruce E. Aldridge and Rangarajan S. Thirumpoondi; assigned to NCR Corporation, is incorporated by reference herein.

Detailed mathematical algorithms can be linked to each segment to project output times, quantities and splits based on observed segment inputs. The segmented approach then defines paths to link segments and model the supply chain or manufacturing flow. The complexities and continuous changes associated with the intricate data models constructed to monitor the numerous events and activities involved in complex manufacturing and supply chain product flows generally makes detailed modeling and predictive analysis difficult as models cannot be physically set up, managed or expeditiously updated with conventional methods.

SUMMARY OF THE INVENTION

In general, a method and system is provided to automatically update complex analytical models used for managing and analyzing a segmented manufacturing or supply chain process. These models include a plurality of segment models, each segment model representing a process segment within the segmented manufacturing or supply chain process and comprising a mathematical expression including at least one parameter. The method of the present invention includes the steps of acquiring actual observed values associated with a process segment corresponding to a segment model; comparing predicted values generated by the segment model with the actual observed values; determining a score representative of the performance of the segment model from the comparison of the predicted values with said actual observed values; statistically determining new parameters for the mathematical equation associated with the segment model when said score indicates an unacceptable performance of the segment model; and updating the segment model with the new parameters.

Other or alternative embodiments will become more apparent from the following description, from the drawings, and from the claims.

BRIEF DESCRIPTION OF THE DRAWINGS

FIGS. 11 and 12 illustrate exemplary output reports (screen shots) generated by the segment model tuning process described herein.

DETAILED DESCRIPTION OF THE INVENTION

Figure 1:
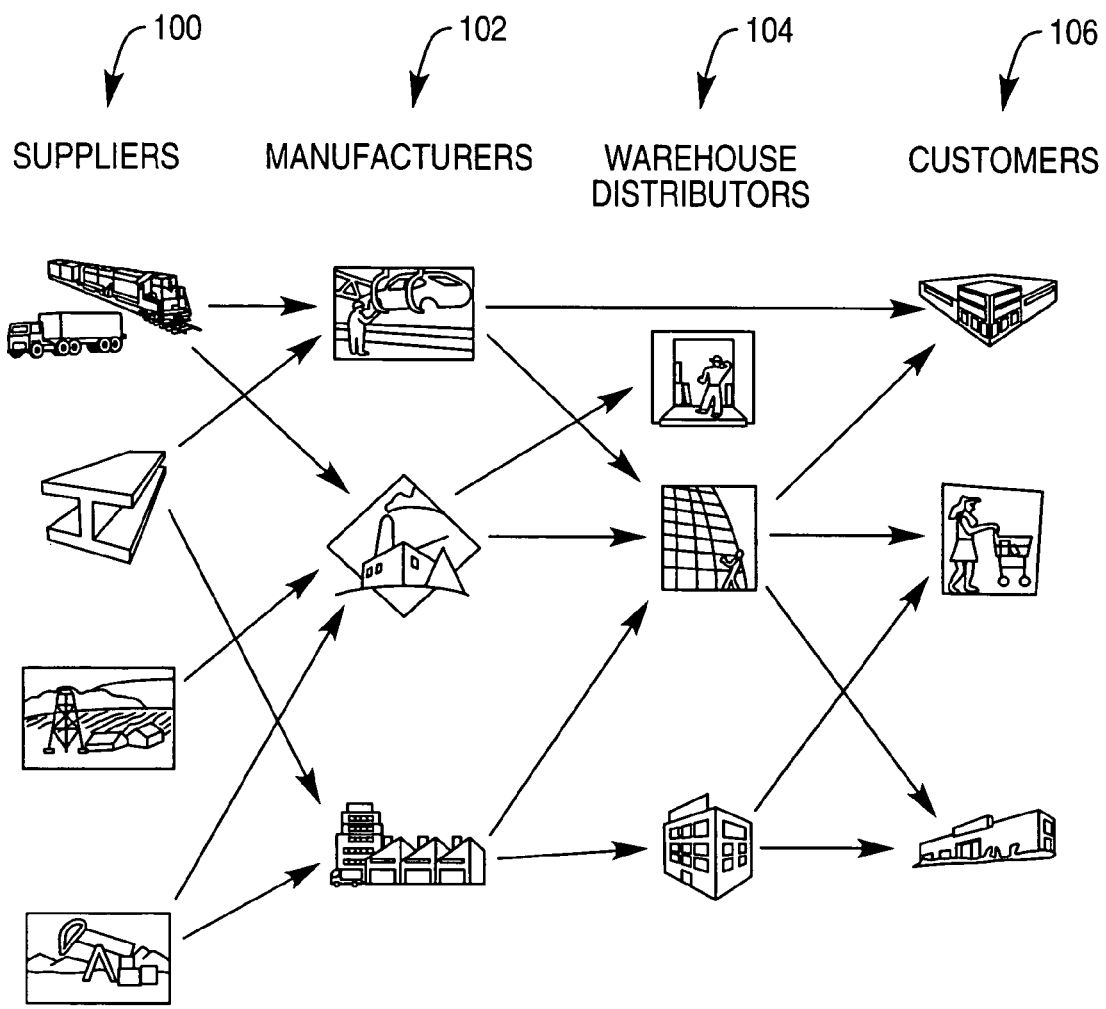
FIG. 1 is a block diagram representing an example supply chain in a manufacturing context.

In the following description, numerous details are set forth to provide an understanding of the present invention. However, it will be understood by those skilled in the art that the present invention may be practiced without these details and that numerous variations or modifications from the described embodiments are possible.

Supply chain logistics involves the process of planning, implementing, and controlling the flow of materials from a point of origin to a point of consumption. Typically, materials undergo value added steps (e.g., manufacturing) and/or integration with other materials at several points in the supply chain. In addition, temporary storage locations are typically utilized to improve efficiencies or to provide a buffer against unexpected variations. Products are moved between these locations by transportation links. By modeling the supply chain using multiple segments, key metrics at any point in the supply chain can be reported, analyzed and/or predicted. To evaluate the metrics, the segments of the supply chain are analyzed successively one at a time. The segments are in effect discrete units that can be independently analyzed relative to the overall supply chain. The results of the analysis of one segment are linked to the analysis of other segments to determine overall results of a selected portion of the supply chain or of the entire supply chain.

Examples of metrics include stock-out conditions (when inventory runs out), activity cost analysis (analysis of the cost associated with each segment), customer service levels, late shipments, manufacturing yield, best and worst case performance analysis, and so forth. A "metric" is a measured or calculated parameter that is derived. Metrics can be categorized into two types: standards metrics and actual metrics. Standards metrics are used to predict values, whereas actual metrics are used to report measured values. In addition to the metrics listed above, other example metrics include the following:

Time to replenishment, which represents the amount of time (expressed in days, for example) until a given shipment of goods to a given location is received. The time to replenishment metric is based on a standard cycle time for each link the shipment has passed through, plus the remaining time in the current link. A "link" is the link in some segments that connects the entry event and the exit event.

Days on hand, which is an amount that represents an expected consumption of goods during a predefined time period.

Demand forecast, which is a periodic planning number for each type of good to forecast the expected demand of that type of good.

Daily demand forecast, which is a value calculated based on the periodic (e.g., monthly) demand forecast.

Quantity on hand, which is the actual available inventory at a location.

Inventory service level days, which is the number of days of forecast demand that a given location is to have on hand of a given type of good to prevent stock out.

Duration in link, which is the elapsed time a shipment has been in a link.

Remaining time in link, which is the estimated time a shipment should still have in the current link.

Link standard time, which is the standard time for a link.

Link actual time, which is the tracked actual time associated with a shipment in a link.

The above lists of metrics are provided as examples only, as other types of metrics can be calculated as specified by a user. Depending on the type of supply chain, any number of user-defined metrics can be specified for a supply chain analysis software to calculate.

Metrics also include alert conditions that are identified by the supply chain analysis software. Examples of alert conditions include a stock-out condition, which is a condition in which an inventory of goods at a given location will run out. Another alert condition is an over-standard condition, in which a shipment of goods is delayed. Another alert condition includes identification of congestion or bottlenecks in the supply chain. In addition, the supply chain analysis software is also able to perform other actions, including estimating the time available before a problem is expected in any part of a supply chain, the potential impact of a problem on a customer, and the action necessary to alleviate the problem. The alert conditions and other parameters are also examples of metrics.

By employing segmented analysis, a supply chain of arbitrary length and complexity can be built. Changes in the supply chain can be easily implemented through the addition or removal of segments corresponding to the change.

Not only does segmentation of the supply chain provide flexibility in modeling and analysis, but segmentation also allows a reduction in uncertainty. Segmentation of the supply chain provides focused analysis, utilizing incremental measurements within each segment. This allows projections to be made based on known times and locations, using detailed models specific to the segment. Also, uncertainty is reduced because of the "shared risk" effect. In essence, inventory at one queue location (warehouse, factory, etc.) can be used to cover multiple locations "downstream" in the supply chain and thereby reduce the risk.

FIG. 1 illustrates an example supply chain that includes four types of entities: suppliers 100, manufacturers 102, warehouses and distributors 104, and end customers 106 (e.g., retail outlets). In efforts to reduce overall costs and improve efficiencies, many businesses rely on strategic partnerships with other businesses. As a result, the various entities in a typical supply chain are associated with different companies or business concerns, which prevents a single-company oriented solution to collecting and analyzing performance of the supply chain.

The suppliers 100 are suppliers of raw materials that are provided to various manufacturers of products, which in turn distribute their products through warehouses and/or distributors to customers. Note that each of the supplier, manufacturer, and warehouse/distributor entities is able to provide materials or products to more than one other entity. Also note that each one of the manufacturer, warehouse/distributor, and customer entities is able to receive materials or products from other entities.

More generally, any component that is processed by or moved between entities of the supply chain is referred to as a "good." For example, a good can refer to a raw material from a supplier that is processed and changed to anther state and/or added with other raw materials to form a larger assembly. A good can also refer to a product at any of its manufacturing stages. If the product is a car, a good can refer to the car at its initial stage of manufacture (frame only), at some intermediate stage, or at the final completion stage.

Although reference is made to a supply chain that provides goods in this description, it is noted that the segmented representation and analysis of supply chains can also apply to service-oriented enterprises. In the service-oriented context, the supply chain can represent various departments of multiple companies, with the "good" representing an order, request, invoice, or other piece of information that is being processed and moved around the various departments.

Figure 2:
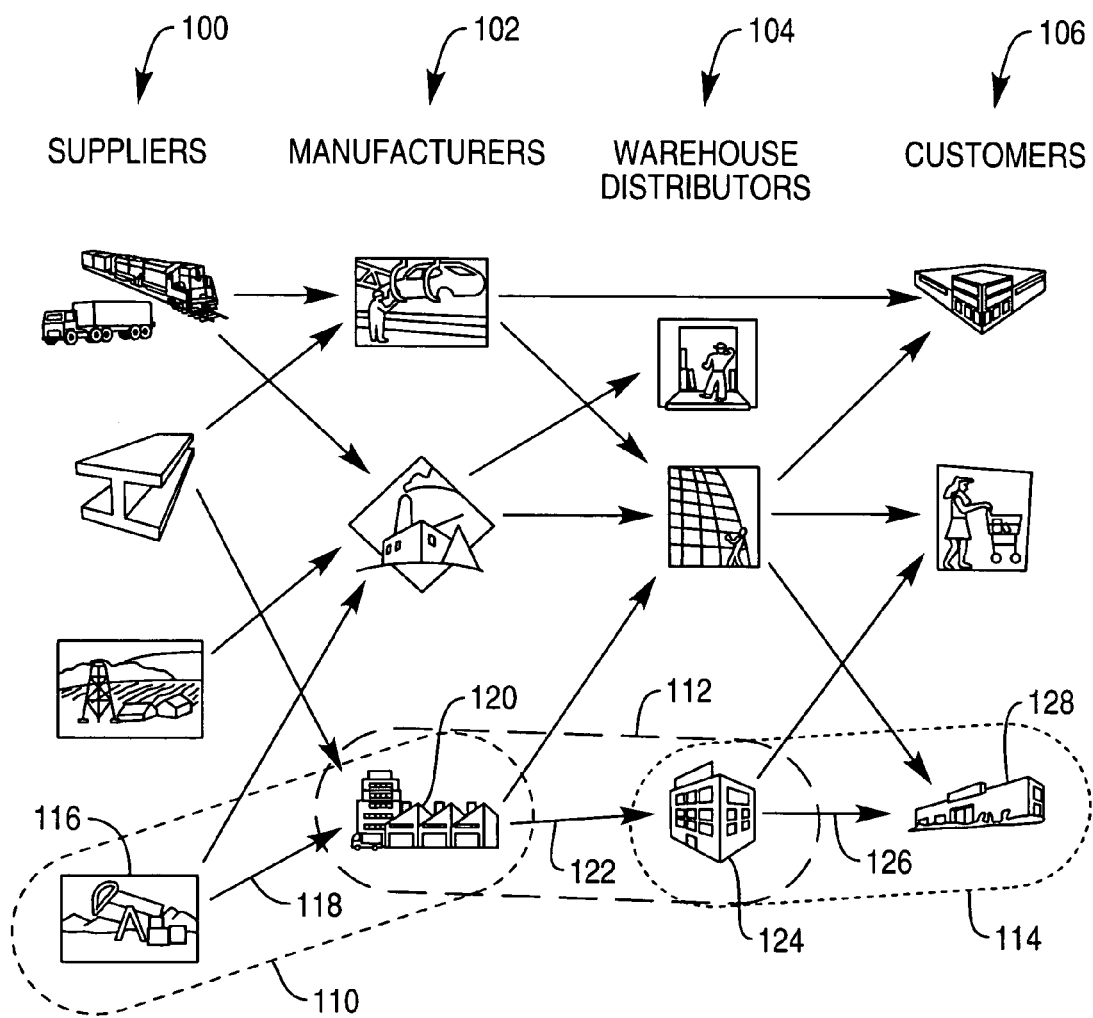
FIG. 2 illustrates segmentation of the supply chain of FIG. 1.

FIG. 2 illustrates the concept of segments in the context of the supply chain of FIG. 1. In FIG. 2, three segments 110, 112, and 114 are identified. The segment 110 is defined by a starting location 116, a transportation link 118, and an ending location 120. The location 120 is also the starting location of the segment 112, which also includes a transportation link 122 and an ending location 124. The segment 114 includes the starting location 124, a transportation link 126, and an ending location 128. Other segments are similarly defined between different starting and ending locations in the supply chain shown in FIG. 2.

Each segment is further associated with one or more additional events that represent specific activities. Such activities include, as examples, an order date, an order quantity, a pickup time, an in-yard arrival time, an inspection time or location, a stock-keep location, and so forth.

Figure 3:
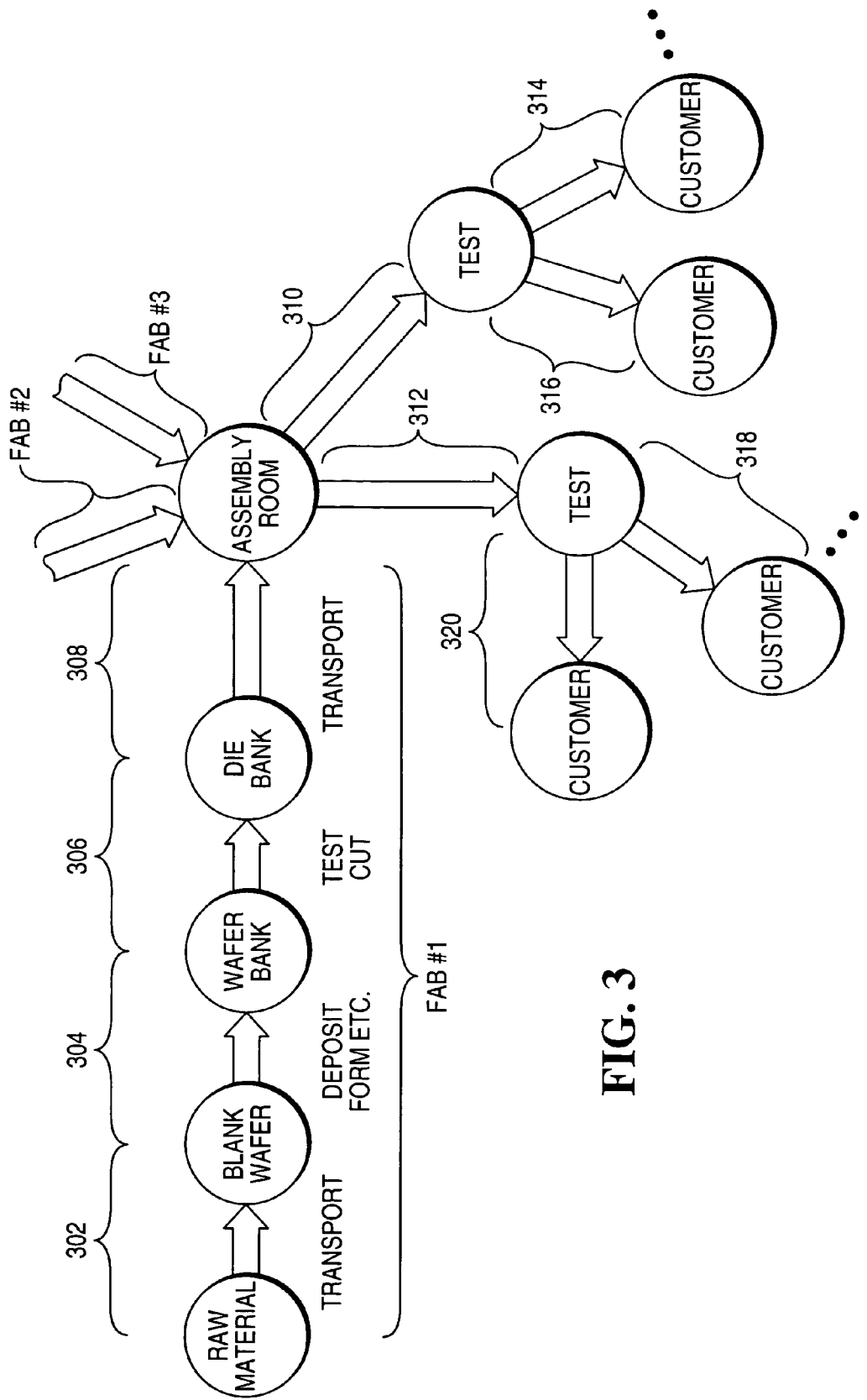
FIG. 3 illustrates another, more specific, example of a supply chain.

FIG. 3 illustrates an example supply chain in a more specific context, namely in a semiconductor manufacturing context. The semiconductor manufacturing supply chain is divided into multiple segments, including segments 302, 304, 306, 308, 310, 312, 314, 316, 318, and 320. The entry event of segment 302 is a raw materials event, which corresponds to a supplier of raw materials. The raw materials are supplied to the input queue of the segment 302. Note that there is usually a large number of suppliers of raw materials, so the raw materials from the multiple suppliers are provided to the input queue of the segment 302. The exit event of segment 302 is a blank wafer event, which is the location of a fabrication facility at which processing of blank wafers start. In a semiconductor fabrication facility, the starting material is a blank wafer on which multiple dies (corresponding to integrated circuit (IC) devices) are formed. The process between the raw materials event and the blank wafer event includes a transport event, where raw materials are transported to other fabrication facilities. The next segment 304 has the blank wafer event as the starting event and a wafer bank event as an exit event. The process between the blank wafer event and the wafer bank event includes events representing a number of manufacturing steps applied to each blank wafer. Such manufacturing steps include depositing various layers onto the blank wafer, forming the various layers to structures making up IC devices, and so forth.

The wafer bank provides a storage for processed wafers that include completed dies on each wafer. The next segment in the semiconductor manufacturing process is segment 306, which includes the wafer bank event as the starting event and a die bank event as the exit event. The die bank stores dies that have been separated from the completed wafers. The process between the wafer bank starting event and the die bank exit event includes testing of dies on the wafer and cutting of functional dies from the wafer to separate the functional dies. The segment following segment 306 is segment 308, which includes the die bank event as an entry event and an assembly room event as the exit event. The process between the die bank entry event and the assembly room exit event includes a transport event, in which dies from the die bank are transported to the assembly room for assembly. The dies are assembled into packages. Although not shown, further segments are part of the semiconductor manufacturing supply chain. Also, as shown in the example of FIG. 3, there are multiple fabrication facilities, referred to as fab 1, fab 2, and fab 3, that all feed the assembly room.

In the example above, the assembly room feeds multiple test sites in segments 310 and 312. Thus, each of segments 310 and 312 has the assembly room event as the starting event, and respective test site events as exit events. From the test sites, further segments 314, 316, 318, and 320 represent the transport of finished IC devices to customers.

The representations shown in FIGS. 1, 2 and 3 are provided as examples only. Actual supply chains are usually much more complex, with a much larger number of segments and events defined.

The goal of analytical modeling utilizing segmentation as a framework is to predict available product quantities and time at the end of the supply chain or manufacturing process. This is accomplished by linking together discrete building blocks or segments of the supply chain and defining mathematical models suitable for projecting the movement of product through each detailed segment.

Figure 4:
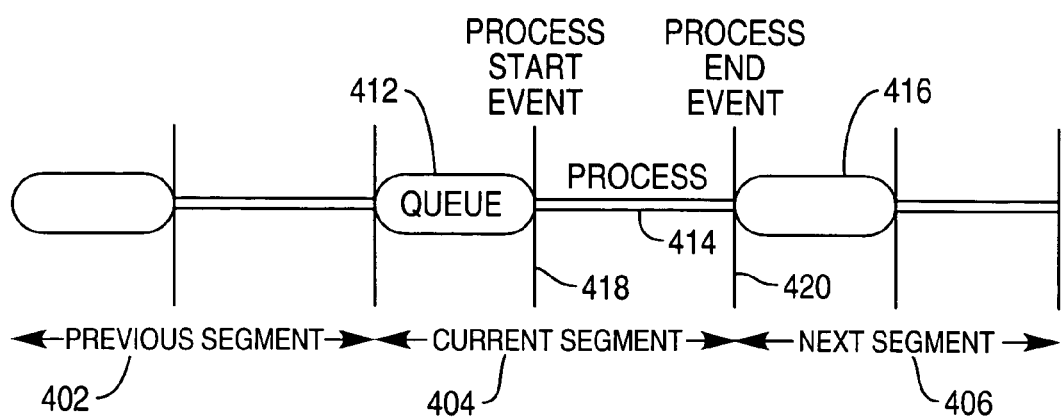
FIG. 4 provides an illustration of one segment of the supply chain.

Referring to FIG. 4, three segments of a supply chain model are represented, identified by reference numerals 400, 402 and 404. Each segment is seen as consisting of two logical parts:

1). a queue area 410, effectively the location of product waiting for the next sequence, and 2.) a process step 412, representing an actual operation or process. The process step can represent a logistical operation (product movement), test, inspection, modification or a transformation of the product.

The segment definition is performed as part of the product configuration and consists of uniquely identifying segments through distinct identifiers or key fields. Thus a logistics segment may be uniquely identified by a source, destination, transportation type and product weight/volume field. A manufacturing segment may be uniquely identified by a machine, process technology or product model. A segment should be defined based on the smallest unit, i.e., queue and process, that is expected to uniquely define a cycle time, yield and any splits/merges.

Each segment must have a minimum of two events, which represent distinct points in time where data is collected. Time and quantity information is collected during these events. These events include a process start event 414 and a process end event 416. The process end event for one segment, e.g. segment 402, corresponds with the queue start time for the succeeding segment, e.g. segment 404. Events may be reused to characterize more than one segment, e.g., one starting event can be used in multiple segments.

As stated earlier, the goal of analytical modeling utilizing segmentation as a framework is to predict available product quantities and time at the end of the supply chain or manufacturing process. There are three values that must be modeled to allow projections of quantity and times. These are: cycle time, quantity (yield), and assignments (path selection, lot splits, merges . . . ).

Cycle time is modeled for both the queue and process. Cycle time in the queue is defined as the time from the previous process step end event until the current segment process start event. Cycle time for the process is defined as the time between the start of the process and the end of the process.

Modeling of input/output quantities are assumed to take place only during the process step. The models do not predict product loss during a queue step. Typical process steps that include yield loss are testing, inspection and transformations where waste may be involved. Generally the quantity projections will be based on a percentage computed from input quantity to output quantity models.

A projected assignment may involve two distinct operations that are handled similarly relative to the models. First, as product moves through a production line or logistics chain, choices in product path direction may be made that result in different treatments. Second, frequently products are reassigned or merged into new groups or lots (lot/batch splits and merges). Segmented modeling analytics assumes that assignments occur only between process steps, i.e., at the queue levels.

Typically, model segments are expressed as mathematical equations, such as a polynomial:

$$f(x) = a_0 + a_1 \cdot x_1 + b_1 \cdot x_2 + c_1 \cdot x_3 + \ldots + a_2 \cdot x_1^2 + b_2 \cdot x_2^2 + c_2 \cdot x_3^2 + \ldots + a_3 \cdot x_1^3 + b_3 \cdot x_2^3 + c_3 \cdot x_3^3 + \ldots$$
$$\epsilon(x_1, x_2, x_3, \ldots)$$

where f(x) represents the predicted value (cycle time, quantity out, assignment percentage); $a_i$, $b_i$, $c_i$ represent parameters for the various observables ($x_i$); and $\epsilon(x_1, x_2, x_3, \ldots)$ represents variability of the model based on the input observables. Other mathematical expressions are possible, however, a polynomial will generally be adequate to model most cases of cycle times, yield and assignments. The parameters (a, b, c ... ) of the equation act to modify the relationship between input and output observables and must be defined, evaluated and frequently changed to accommodate changes in product flow, different product mixes, conditions, etc. This representation of the model readily adapts itself to storage in a data warehouse—the parameters, $a_i$, $b_i$, $c_i$ ... and the observables $x_i$ defining the model.

Each of the predictive analytics—cycle time, yield and assignments—must have a mathematical model associated with it. The segment model will consist of the following:
Number of parameters (minimum 1);
Parameter/observation relations (parameter 1=constant, parameter 2 associated with product weight, etc.);
Transformation (add, subtract multiply, divide, power);
Error distribution type; and
Error distribution parameters (standard deviation)
Two example segment models will now be described.

The first example, a simple model for cycle time, is a segment without splits and a fixed (constant) cycle time with normally distributed error values and a fixed yield (with normally distributed errors). The segment model for this example consists of the following:
1 parameter (cycle time=5 days)
No relationships between observations and parameters
No transformation
Error distribution=normal
Error distribution parameters (std. deviation=2.2 days).

This simple model for cycle time (CT) can be expressed as CT=5+/−2.2. The parameters associated with the model are 5 and 2.2.

The second example is a more complex example with a yield function expressed by the equation process yield=97.5%−0.1% *batch quantity. Error is chi squared distributed. The segment model for this example consists of the following:
2 parameters, a constant of 97.5% and a multiplicative parameter of 0.1%
Parameter 2 (0.1%) is multiplied by observed batch quantity and subtracted from parameter 1
No additional transformations (logs, powers, truncation)
Error distribution (Chi squared)
Error parameters—5 degrees of freedom (defines mean and shape)

Figure 5:
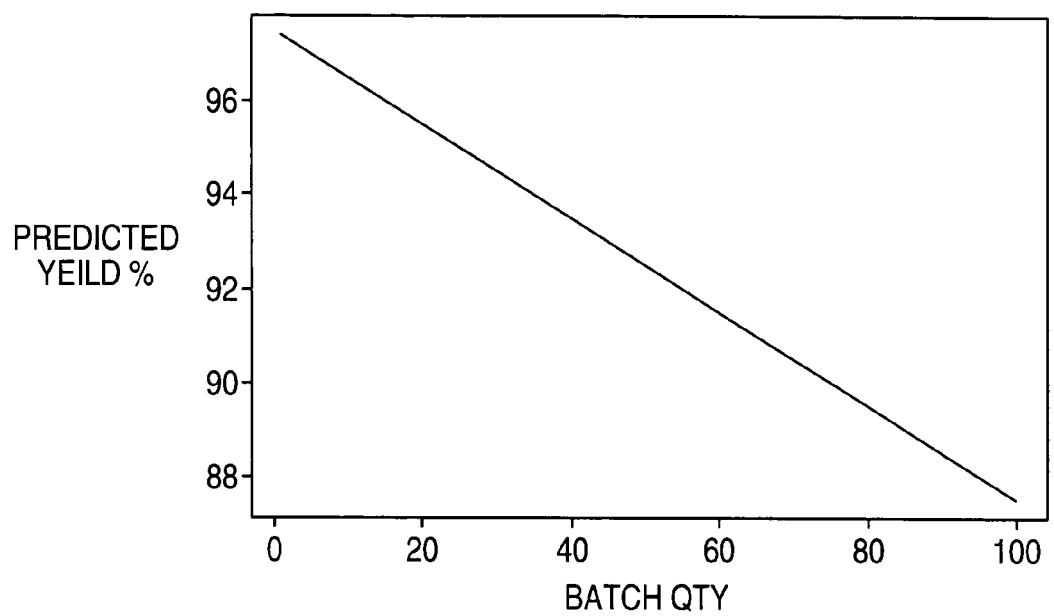
FIG. 5 is graph illustrating the predicted yield for an example process yield model.
Figure 6:
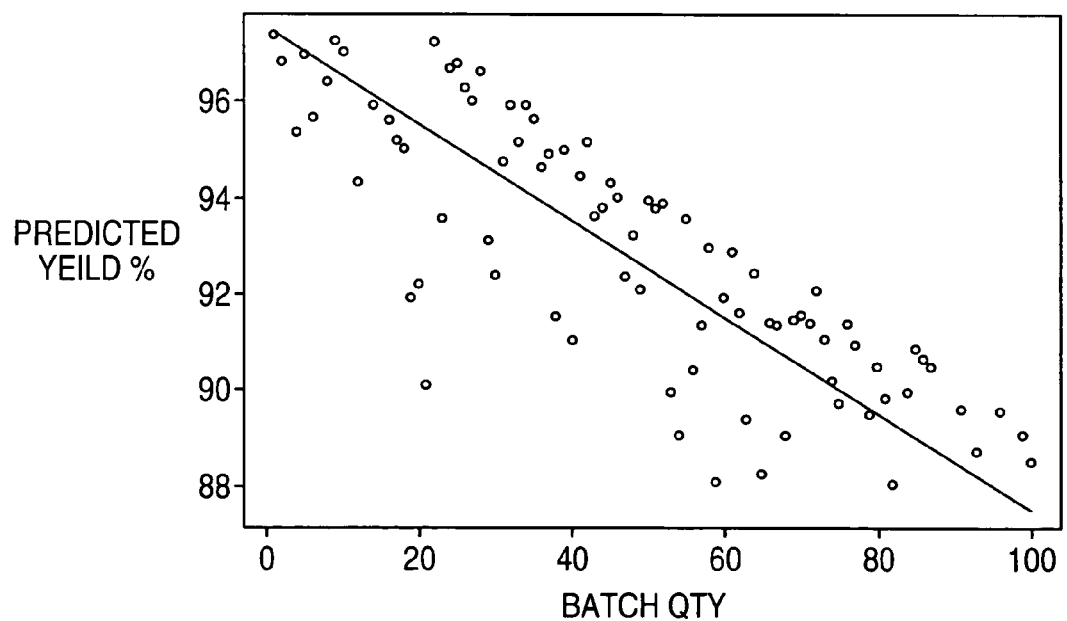
FIG. 6 is a graph illustrating the results of a simulation of the example process yield model of FIG. 5 including a variability estimate.

In this example, the observed quantities are multiplied by a parameter and subtracted from a constant to provide a predicted yield, as illustrated by the graph shown in FIG. 5. The graph shown in FIG. 6 illustrates the results of a simulation of the process yield example model with the variability estimate. Note the occasional low yield lot shown below the line, whereas high yield lots have a more "bounded" effect.

The mathematical models used in predictive analytics are meant to be representative of the actual processes. Because the model is supposed to represent reality, a method must be put in place to evaluate and update values for the parameters and variability to maintain consistency with the actual processes. This will allow use of the models to dependably predict the most likely outcome and estimate the likely amount of error.

Figure 7:
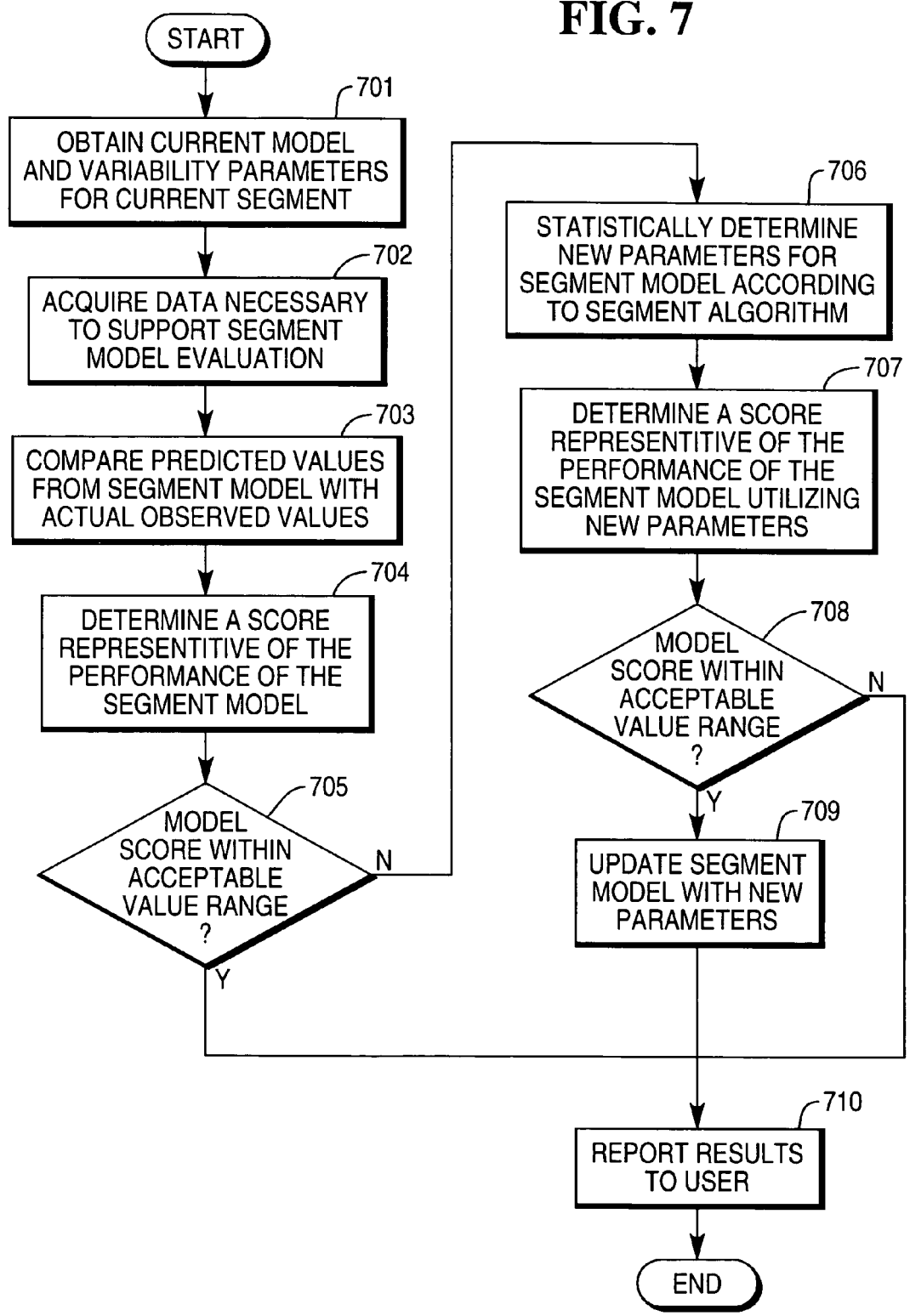
FIG. 7 is a flow diagram of a process for tuning supply chain model segment parameters in accordance with the present invention.

A method for evaluating and updating segment model parameters is illustrated in the flow diagram of FIG. 7. The process for evaluating a segment's model parameters begins in step 701 by obtaining the current model and variability parameters for the segment. In step 702, the data necessary to support the segment model evaluation is acquired. Actual observations for cycle times, yields, and assignment percentages must be collected and saved, preferably within a database, based on the current segment definitions. Enough data must be collected to give statistical confidence to the model analysis, typically ten or more points. These points are collected from the database with various filters such as a date range or minimum quantity, i.e., collect last 10 data points.

Predicted values for cycle time, yield, or assignment percentages from the model are compared with actual observed values in step 703. A score representing the performance or 'fit' of the segment model is determined in step 704. The scores are used to rapidly identify segments and models that are most in need of "tuning". Factors such as business costs may be included directly or indirectly into the scored analysis as additional terms or weighting factors. The scores are used to rapidly identify the segments and models that are most in need of "tuning".

At step 705, the model score determined in step 704 is examined and compared to a threshold value. If the model score is within an acceptable level, the segment model is not considered a candidate for tuning and the process illustrated in FIG. 7 comes to a conclusion. If the model score is not within acceptable limits, new parameters for the segment model algorithm are statistically determined in step 706.

At step 707, a score representing the performance or 'fit' of the segment model utilizing the new parameters is determined. The scoring algorithm is identical to the one used in step 704. This new score is evaluated in step 708 and if within an acceptable level, the segment model updated with the new parameters, step 709, and the process concludes. The proposed model parameters represent statistical estimates of how to best fit the observed data. It is expected that in some cases, the user may wish to override these automatically generated values with manual entries. Once the model values are accepted and evaluated as to the effects on scoring, the user is able to commit the updates to the database. This is generally done by applying updates to the standards table based on accepted changes or changes made through manual overrides.

If the new model score is not within acceptable limits, the segment model is not updated and, as shown in step 710, a report is generated to provide process scores and results to the user.

This scoring process will be illustrated for the two examples described above. The first example concerned a simple model for cycle time, the model having a single parameter. Models with a single parameter are generally completely defined by the segment definition (key fields) and have no explicit dependence on observed values in the model. In other words, the model is a constant. Evaluation then becomes a matter of determining the constant and evaluating the error distribution.

The constant represents the expected value of the model in the absence of errors or variability. It should therefore be estimated with robust methodologies such as the median of the observed values.

Deviations of the observed actual values from the constant can be interpreted as error or variability. This is statistically evaluated by comparing the differences between actuals and the model parameter to the expected distribution using common statistical distribution techniques, e.g., normal, poisson, chi square, etc.

Several techniques for evaluation of the residuals, i.e., difference between observed and models, but a qq-distribution plot provides a straightforward methodology that also lends itself to determination of robust estimates of the variability. In a qq-distribution plot, the residual values are plotted against the quantiles of the theoretical distribution describing the variability. If the residuals are from the same distribution, the resulting line will be linear. Outliers of the distribution are automatically identified at either end of the plot and parallel percentage scales can provide a useful estimate of the confidence of the fit (i.e., if the outliers are at or beyond the $95^{th}$ quantile).

A typical example is applied to residuals that follow a normal (Gaussian) distribution. In this case the normal distribution is estimated by the mean and standard deviation and the sorted data is plotted against the percentile as illustrated in the sequence of diagrams shown in FIGS. 8 through 10.

Figure 8:
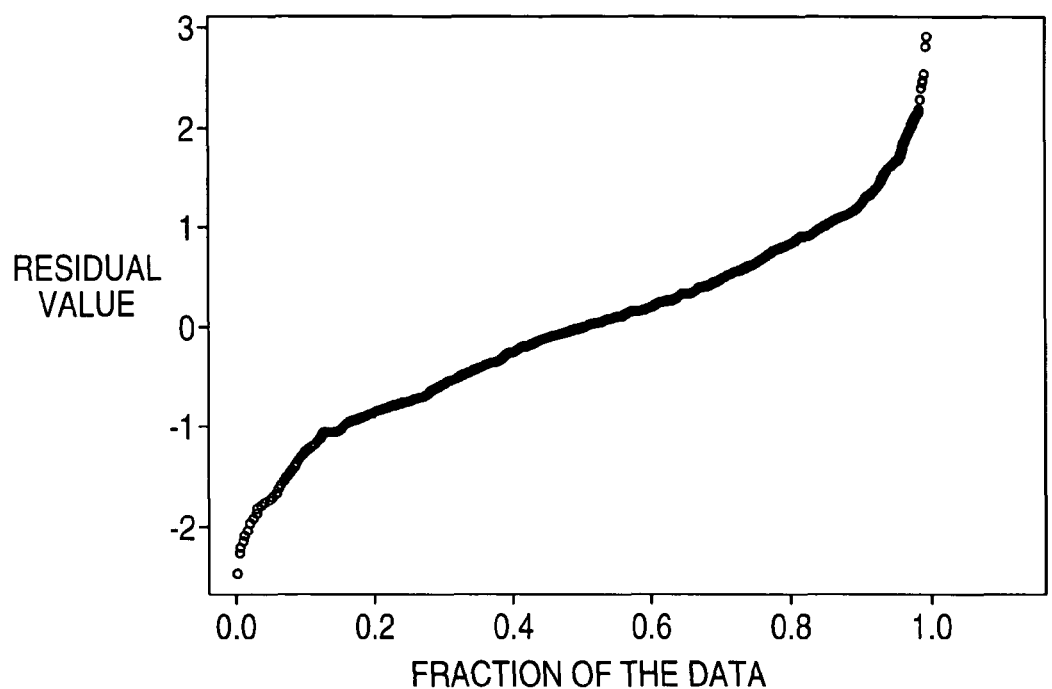
FIG. 8 is a cumulative distribution plot illustrating the range in variability from the observed values, e.g., cycle time, yield, assignment percentages, for an example supply chain segment.

The first plot, shown in FIG. 8, is also known as a cumulative distribution plot, and it shows range in variability from the observed values (e.g., cycle time, yield, assignment percentages). Errors that are normally distributed are expected to have a cdf similar to FIG. 8 by being symmetric with curvature at low and high percentages.

Figure 9:
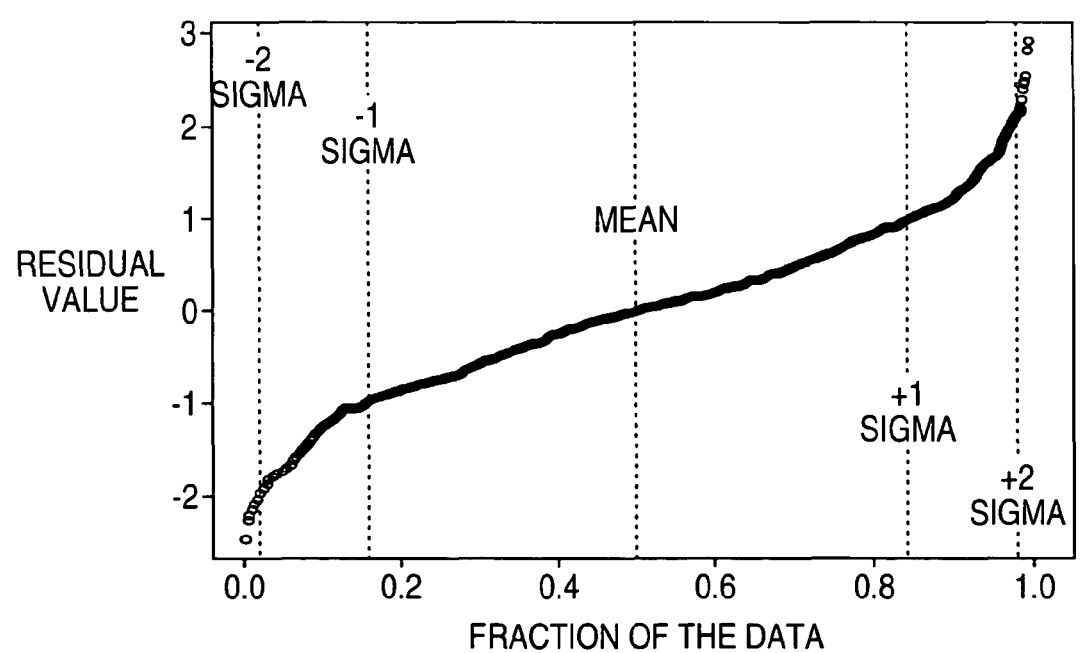
FIG. 9 is the cumulative distribution plot of FIG. 8 including an overlay of computed values for standard deviation.

The next plot, shown in FIG. 9, is identical to that shown in FIG. 8 except that the computed values for standard deviation are overlayed.

Figure 10:
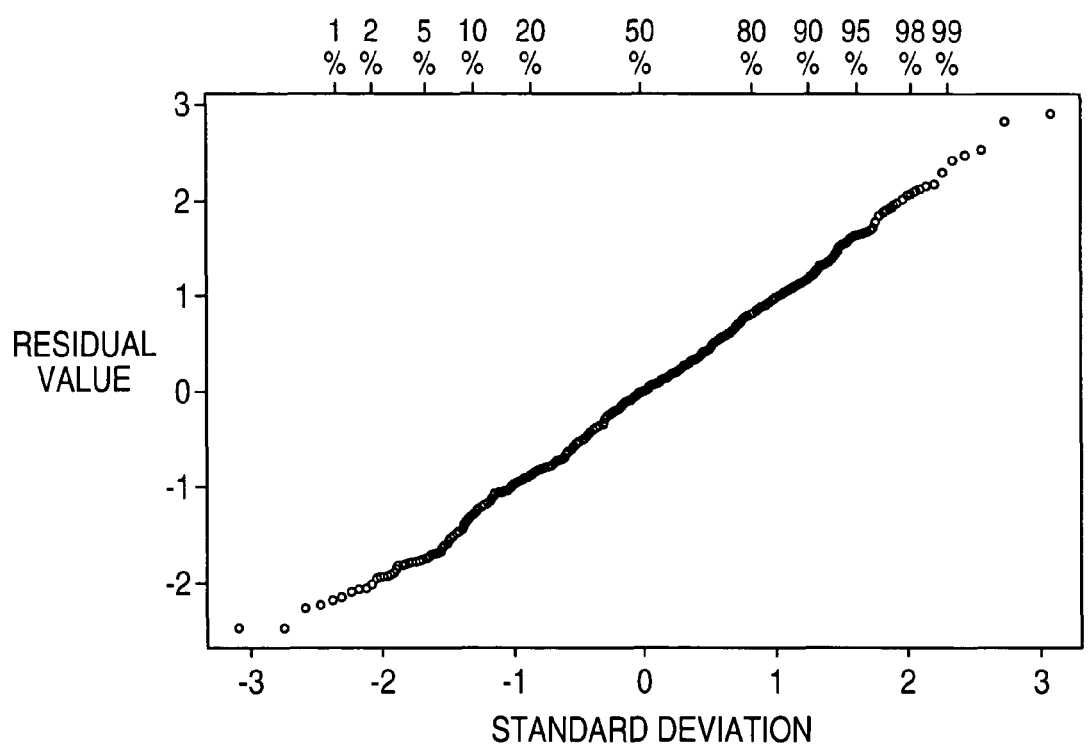
FIG. 10 is a qqnorm plot illustrating the correlation between the standard deviation and the quantile (percentage of data) for the example supply chain segment of FIGS. 8 and 9.

This correlation between the standard deviation and the quantile (percentage of data) is the basis of the qqnorm plot, shown in FIG. 10.

Note the x axis is now linearlized relative to the standard deviation—therefore the data is much denser in the center and becomes very sparse at the ends. A corresponding percentage axis is shown across the top of the figure.

Error values and variability that are normally distributed will appear as a straight line on this plot with a slope equal to the standard deviation and the center of the plot located at the center of the error distribution (in this case 0).

The methodology outlined above suggests that two scores be utilized to evaluate the fit of the model. These are:
1) Evaluation of the constant parameter
2) Evaluation of the variability.

The constant can be readily scored with standard statistical tests to determine the probability that the new, best fit, constant parameter came from the expected distribution—or a t-test.

There are several methods available for determining if the variability is as expected, but one of the simpler methods is to evaluate the plot of FIG. 10 relative to a straight line with linear regression.

These values can then be reported on separately or combined to determine both the appropriate fit of the observed values to the model parameter and the shape of the variability.

The second example discussed above concerned a more complex example for a yield function, including more than one parameter and non-normal variability. Proceeding as in the previous case, the model parameters and observed values necessary for the model are extracted. Statistical techniques, such as linear regression, are used to evaluate the parameters appropriate for the model. Finally, the residuals are computed and evaluated as before.

Figure 11:
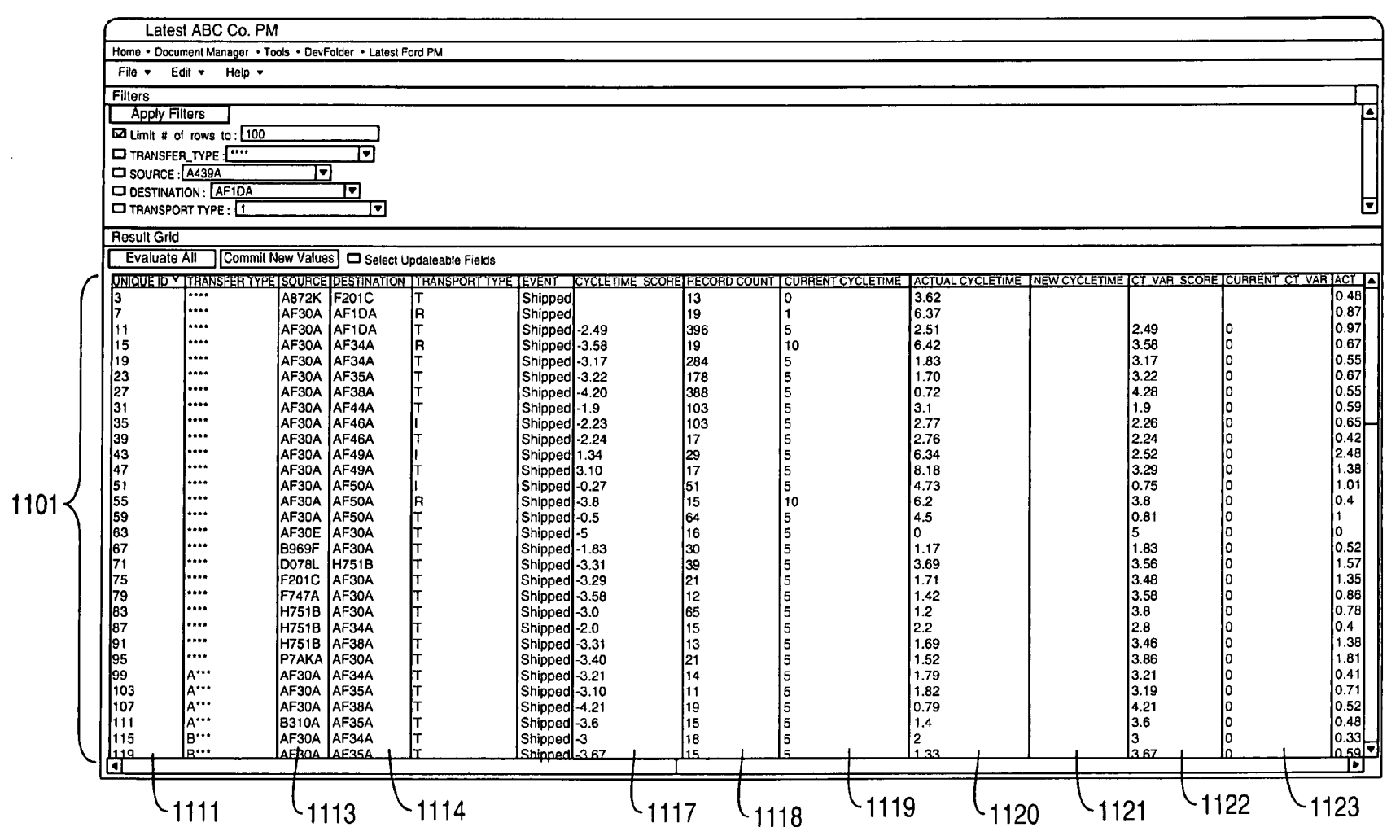
Figure 12:
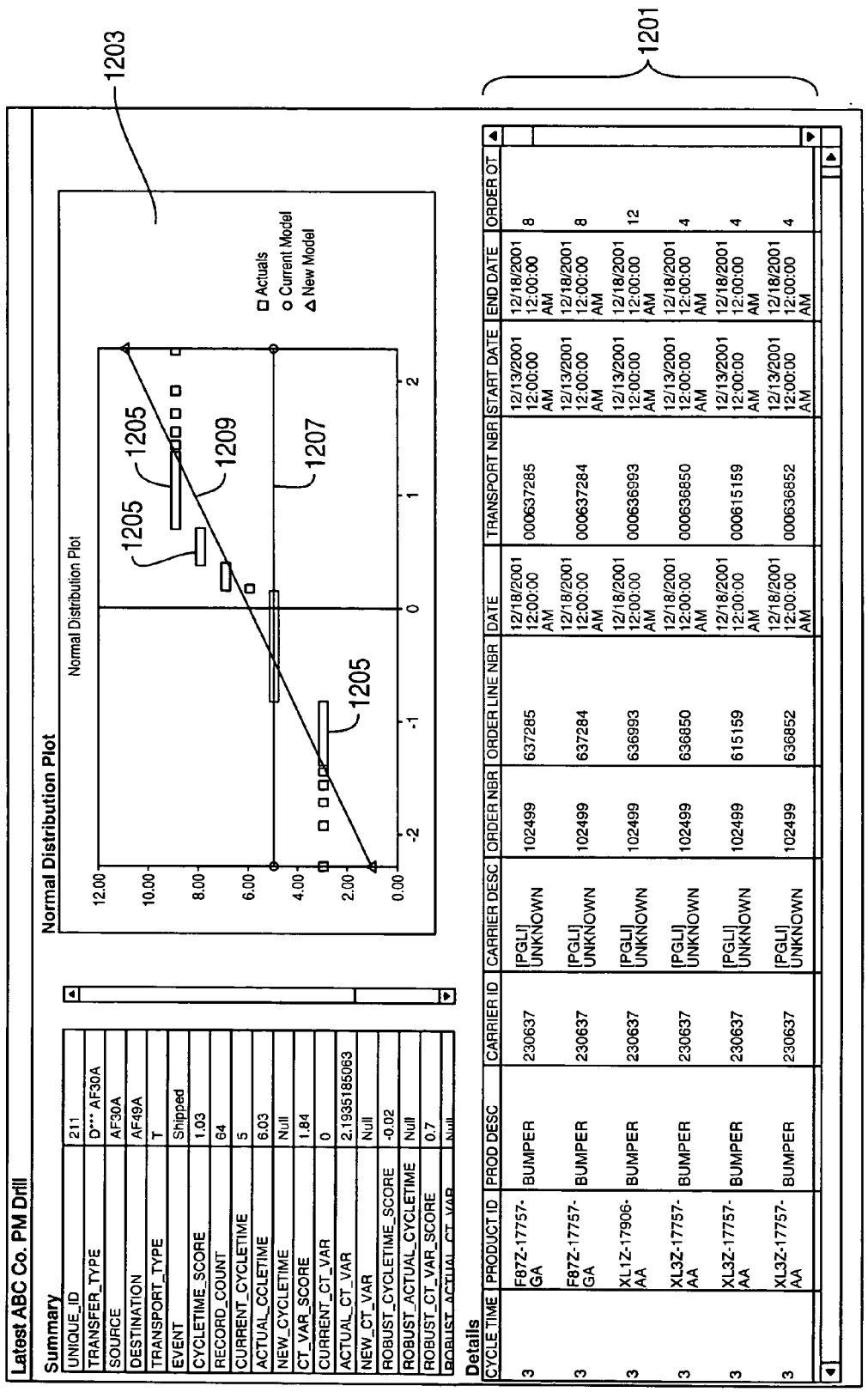

FIGS. 11 and 12 illustrate exemplary output reports (screen shots) generated by the segment model tuning process described herein for a fictitious entity named ABC Company.

FIG. 11 shows the presentation of the model by segment, and FIG. 12 provides details of the statistical analysis of a segment model.

The lower potion 1101 of the screen shot shown in FIG. 11 displays in a table format details concerning a number of supply chain segments, each segment occupying one row of the table. Each segment is identified by a unique ID in the first column 1111 of the table. Each segment shown models a shipping segment of a supply chain. Shipping source and destination codes are provided in columns 1113 and 1114, respectively. Cycle time information, scores and record counts are displayed in columns 1117 through 1123.

FIG. 12 provides details of the statistical analysis of a segment model ID 211 for the ABC Company. The lower portion 1201 of the screen shot displays detailed information for several shipping deliveries corresponding to segment model ID 211. Frame 1203 graphically displays actual cycle time values for each shipping delivery, the current model 1207 for the segment, and a proposed new model 1209 for the segment. Each actual cycle time is represented by a box 1205.

While the invention has been disclosed with respect to a limited number of embodiments, those skilled in the art will appreciate numerous modifications and variations there from. For example, models representing segmented manufacturing and supply chain process are described herein. However, the methods described and claimed herein may be readily applied to logistical processes other than manufacturing or supply chain processes. It is intended that the appended claims cover such modifications and variations as fall within the true spirit and scope of the invention.

What is claimed is:

1. A computer-implemented method for managing and modeling a segmented logistical process; the steps comprising:

creating a computer model of said segmented logistical process with a plurality of segment models, each segment model representing a process segment within said segmented logistical process and comprising a mathematical expression including at least one parameter; and for each segment model:

acquiring actual observed values associated with the process segment corresponding to said segment model;

electronically comparing, by a computer, predicted values generated by the segment model with said actual observed values;

electronically determining, by said computer, a score representative of the performance of said segment model from said comparison of the predicted values with said actual observed values;

statistically determining, by said computer, new parameters for the mathematical equation associated with said segment model when said score indicates an unacceptable performance of said segment model; and electronically updating, by said computer, said segment model with said new parameters.

2. The method for managing and modeling a segmented logistical process in accordance with claim 1, wherein said step of updating said segment model with said new parameters includes the steps of:

electronically determining, by said computer, a score representative of the performance of said segment model utilizing said new parameters; and electronically updating, by said computer, said segment model with said new parameters when said last-recited score indicates an acceptable performance of said segment model.

3. The method for managing and modeling a segmented logistical process in accordance with claim 1, wherein said logistical process comprises a manufacturing process.

4. The method for managing and modeling a segmented logistical process in accordance with claim 1, wherein said logistical process comprises a supply chain process.

5. A computer-implemented method for updating a segment model which represents a process segment within a segmented logistical process, said segment model comprising a mathematical expression including at least one parameter; the method comprising the steps of:

acquiring actual observed values associated with said process segment;

electronically comparing, by a computer, predicted values generated by the segment model with said actual observed values;

electronically determining, by said computer, a score representative of the performance of said segment model from said comparison of the predicted values with said actual observed values;

statistically determining, by said computer, new parameters for the mathematical equation associated with said segment model when said score indicates an unacceptable performance of said segment model; and electronically updating, by said computer, said segment model with said new parameters.

6. The method in accordance with claim 5, wherein said step of updating said segment model with said new parameters includes the steps of:

electronically determining, by said computer, a score representative of the performance of said segment model utilizing said new parameters; and eletronically updating, by said computer, said segment model with said new parameters when said last-recited score indicates an acceptable performance of said segment model.

7. The method in accordance with claim 5, wherein said logistical process comprises a manufacturing process.

8. The method in accordance with claim 5, wherein said logistical process comprises a supply chain process.

9. In a system for modeling a segmented logistical process with a plurality of segment models, each segment model representing a process segment within said segmented logistical process, and each segment model comprising a mathematical expression including at least one parameter; the improvement comprising:

means for updating said segment models, said means performing the steps of:

acquiring actual observed values associated with a process segment;

comparing predicted values generated by the segment model representing said process segment with said actual observed values;

determining a score representative of the performance of said segment model from said comparison of the predicted values with said actual observed values;

statistically determining new parameters for the mathematical equation associated with said segment model when said score indicates an unacceptable performance of said segment model; and updating said segment model with said new parameters.

10. The system in accordance with claim 9, wherein said logistical process comprises a manufacturing process.

11. The system in accordance with claim 9, wherein said logistical process comprises a supply chain process.

\* \* \* \* \*